Aug. 31, 1937. W. W. SAYERS ET AL 2,091,836
CHAIN
Filed Jan. 5, 1935 2 Sheets-Sheet 1

Inventors
William W. Sayers
Richard F. Bergmann
George W. Haaff
by Parker & Carter
Attorneys.

Aug. 31, 1937.  W. W. SAYERS ET AL  2,091,836
CHAIN
Filed Jan. 5, 1935   2 Sheets-Sheet 2

Inventors
William W. Sayers
Richard F. Bergmann
George W. Haaff
by Parker & Carter
Attorneys.

Patented Aug. 31, 1937

2,091,836

UNITED STATES PATENT OFFICE 2,091,836

CHAIN

William W. Sayers and Richard F. Bergmann, Chicago, Ill., and George W. Haaff, Indianapolis, Ind., assignors to Link-Belt Company, Chicago, Ill., a corporation of Illinois Application January 5, 1935, Serial No. 480

4 Claims. (Cl. 74—246)

This invention relates to chains. In one form it may be embodied in a conveyor chain arranged to move along a path curving to a greater or less degree, so that it may thus have both lateral and longitudinal bending movement, and one of the objects of the invention is to provide such chain.

Another important object of the invention is to provide a pintle and link construction in which there is embodied a ball and socket within the chain joint which will permit within certain limits substantially universal movement and which will in particular permit bending movement laterally as well as axially of the chain.

Another object is to provide in connection with such a ball and socket arrangement a construction by means of which the chain may be quickly coupled and uncoupled without the necessity of riveting or unriveting parts and without the necessity of other slow and cumbersome operations so that the chain may be coupled and uncoupled readily and with a minimum of delay in the operation of a conveyor or other apparatus in which the chain is associated. The chain, while it may be made of any suitable material, lends itself particularly to manufacture by casting and for many purposes this has an important advantage because cast metals tend to resist acids which are frequently present in associations where conveying chains of this general type are used.

Other objects will appear from time to time in the specification and claims.

The invention is illustrated more or less diagrammatically in the accompanying drawings, wherein:—

Like parts are designated by like characters throughout the specification and drawings.

Figure 1:
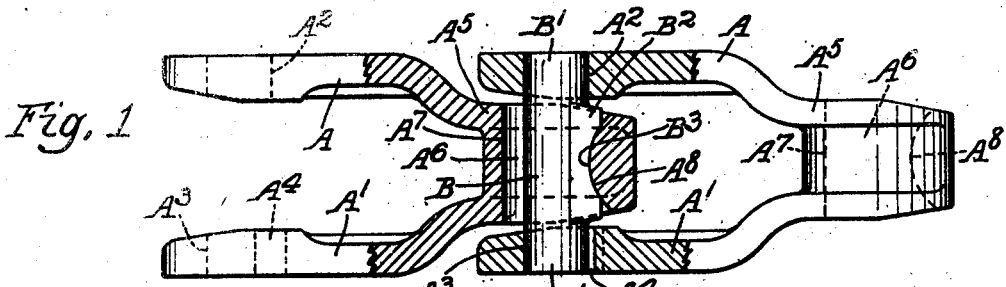
Figure 1 is a plan view with parts in section and parts broken away, illustrating two links connected to each other.
Figure 2:
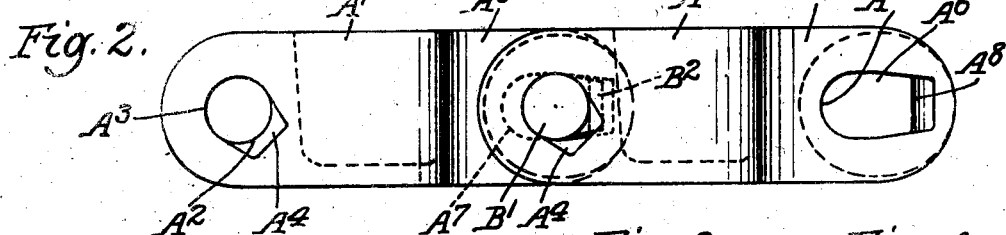
Figure 2 is a side elevation of the chain shown in Figure 1.

The links in the form shown in Figures 1 and 2 comprise side bars A, $A^1$. The bars A have preferably rounded perforations $A^2$ and the bars $A^1$ have perforations $A^3$, which are generally circular as shown in Figure 2 particularly, but provided with an enlarged, more or less angular portion $A^4$. The openings in both of the bars A, $A^1$ might be the same in shape as that shown in the bar $A^1$, namely, enlarged as at $A^4$, so that the pintle could be slipped into place and removed from place through either of the side bars. Ordinarily, however, it is preferable to have the perforation in one bar round and to permit insertion and removal of the pintle through only one of the bars. The side bars A and $A^1$ are inclined toward each other adjacent the opposite end of the link and merge into a unitary inner portion $A^5$ through which a perforation $A^6$ is formed. The perforation $A^6$ is preferably provided with a generally semi-cylindrical portion $A^7$ at its rear end. At its outer end, as viewed particularly in Figure 2, it is provided with a generally vertical wall $A^8$, which, however, as viewed in Figure 1, is shown to be curved about a radius drawn transversely of the chain. The curved, generally vertical wall $A^8$ thus furnishes a rounded portion to co-operate with the pintle pin.

Figures 3, 4:
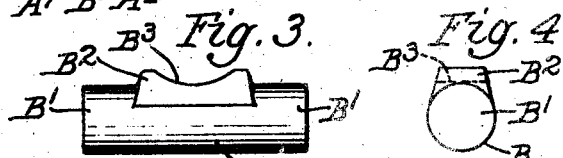
Figure 3 is a side elevation showing the pintle pin removed from the link.
Figure 4 is an end view of the pintle.

As shown in Figures 1 and 2 generally, and in detail in Figures 3 and 4, B is a pintle pin. It is generally cylindrical at its ends as at $B^1$, $B^1$. Intermediate its ends it is provided with a raised, longitudinally extended portion $B^2$ of generally non-circular or angular cross-section and having a concave depression $B^3$ in its upper surface. This depression $B^3$ is preferably rounded and its curvature is preferably substantially concentric with the curvature of the curved wall $A^8$, so that together the two form a bearing surface and permit ready lateral bending of the chain links with respect to each other. The perforation $A^3$, $A^4$ is of such size and shape as to permit the pin and its raised portion $B^2$ to pass through it and into position in the link, but this entrance of the pin into the link can only be accomplished when two adjacent links are bent out of their normal working position and into the position shown in Figure 9. In that position the perforation $A^3$, $A^4$ is properly in line with the perforation $A^6$ to permit the entrance or exit of the pintle for coupling or uncoupling the chain links. In normal operation of the chain the links do not get into this uncoupling position and hence undue lateral displacement and accidental loss of the pintle is impossible.

The shape of the pintle pin and of the perforation $A^6$ is such that the pintle is substantially held against rotation and the adjacent chain link which is pivoted upon it rotates about the rounded portions $B^1$ of the pintle. When the chain bends laterally, however, the pintle moves about the curved, generally vertical surface $A^8$.

In the forms of the other figures, the relative co-operation between the pintle pin and the shape of the perforation within which it lies is generally the same. It is such as to permit the normal bending of the chain in its longitudinal axis and such also as to permit the lateral bending of the chain, within limits, dependent on the size and shape of the parts.

Figure 5:
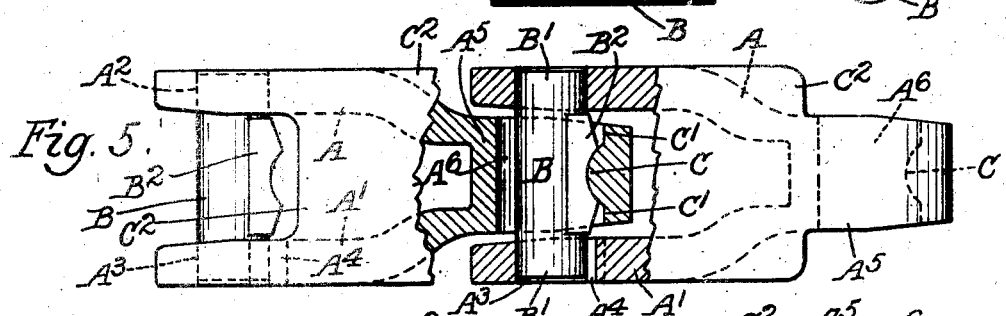
Figure 5 is a view generally similar to Figure 1, showing a modified form, each link having a top cover.
Figure 6:
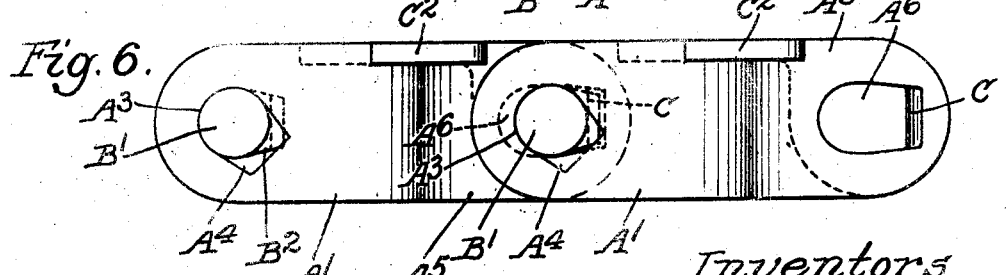
Figure 6 is a side elevation of the chain of Figure 5.

As shown in Figures 5 and 6 the chain links are generally the same as those shown in Figures 1 and 2, however, a smaller ball and socket joint is provided. The perforation $A^6$ has a curved end wall C, which, unlike the end wall A, in the form shown in Figure 2, does not comprise the entire end of the perforation $A^6$. It merges into two inclined parts $C^1$, $C^1$. To compensate for this change the pintle $B^1$, in the form used in Figures 5 and 6, while it is generally of the same form shown in Figure 3, is modified in size to correspond with the smaller size of the curved wall C. Otherwise it is substantially the same as shown in Figure 3. On the upper part of each of the links shown in Figures 5 and 6 and formed preferably integrally with the link is a cover plate $C^2$.

Figure 9:
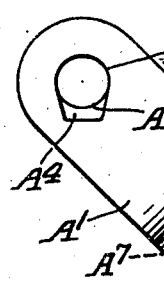
Figure 9 is a side elevation showing chain links in uncoupling position.

The combined shape of the curved portion $B^1$ and the projection $B^2$ of the pintle B is such that the pintle can be inserted and removed from the links only when two adjacent links are turned to approximately the position shown in Figure 9.

In the forms of the chain described above, the concave portion is on the pintle and the convex portion is on the inside of a perforation in the link. In the form of the invention shown in Figures 7 and 8, this relationship is reversed and a concave depression is formed in one wall of a perforation in the link while a convex projection is formed on the pintle pin. This form of the device, however, in common with the forms described above, provides for lateral as well as longitudinal bending of the chain and provides a chain joint in which a concave and a convex member co-operate to permit lateral bending of the chain.

Figure 7:
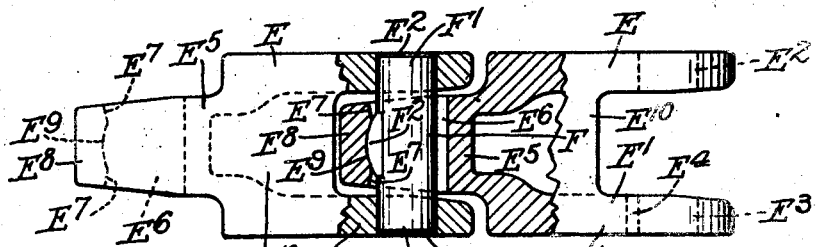
Figure 7 is a view generally similar to Figure 1, illustrating a further modified form.
Figure 8:
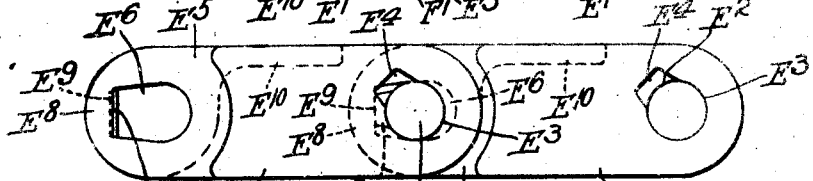
Figure 8 is a side elevation of the chain shown in Figure 7.

The link of Figures 7 and 8 comprises side bars E, $E^1$. A round perforation $E^2$ is formed in the side bar E and a perforation $E^3$, $E^4$ is formed in the side bar $E^1$. As formed, this perforation comprises the out-of-round portion $E^4$ which co-operates to lock the pintle in place to prevent its accidental loss or displacement as will be described below. The side bars E, $E^1$ converge and blend with an inner end section $E^5$. This section is provided with a perforation $E^6$ which is generally elliptical in cross section and may flare outwardly as at $E^7$, as shown in Figure 7. In its forward or outer wall $E^8$ is formed a concave depression $E^9$, the walls of which are generally vertical. A top plate or cover plate $E^{10}$ extends across the side bars and forms in effect a cover for the space between them.

F is a pintle provided with rounded end sections $F^1$, $F^1$ and having intermediate its ends a convex projection $F^2$, which when the chain is assembled, fits into the concave depression $E^9$ in the front wall of the perforation $E^6$. The curvature of the concave and the convex members just mentioned is preferably formed of generally the same radius so that they fit together and form a bearing about which the chain links may rock freely within the desired limits to permit lateral bending of the chain.

Figure 10:
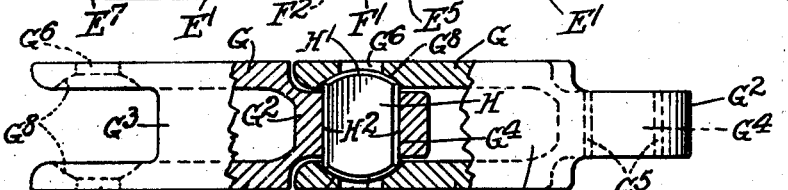
Figure 10 is a view generally similar to Figure 1, illustrating a further modified form.
Figure 11:
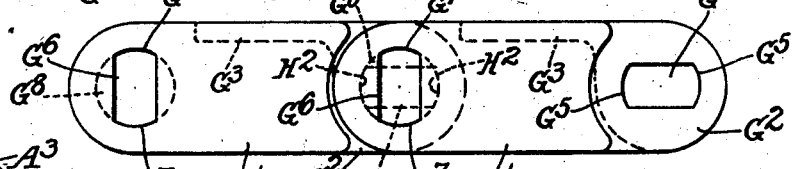
Figure 11 is a side elevation of the chain shown in Figure 10.

The link in the form shown in Figures 10 and 11 comprises side bars G, $G^1$, which are joined to a central portion $G^2$. A top or cover portion $G^3$ may extend across between the side bars G and $G^1$. The central portion $G^2$ of each link is provided with a relatively flat perforation $G^4$ which may have its front and rear walls slightly rounded as at $G^5$. The side bars G and $G^1$ are provided with vertically extending slots $G^6$, $G^6$. As will be seen particularly from Figure 13 the slots or perforations $G^6$ extend vertically, that is to say, at right angles to the perforations $G^4$ which extend generally horizontally. The upper and lower walls of the slots $G^6$ may be rounded as at $G^7$, $G^7$. On the inner faces of the side bars G and $G^1$ and in communication with the slots $G^5$ are formed concave depressions $G^8$ which are preferably portions of spheres.

Figure 12:
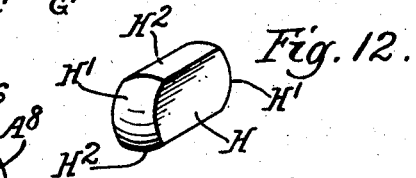
Figure 12 is a perspective view of the pintle in the form used in Figures 10 and 11.

The pintle in the form used in Figures 10 and 11 is shown in detail in Figure 12, and as there shown it comprises what might be called a disc H. In plan its outer ends or edges are rounded as at $H^1$, $H^1$ and it is provided with front and rear edges $H^2$, $H^2$ which are straight in a direction crosswise of the link and are rounded to correspond generally to the shape of the slots or perforations $G^4$. Thus when the pintles lie within the perforations or slots $G^4$, as shown particularly in Figure 10, they are held against rotation about an axis crosswise of the link but may rotate in a plane generally parallel to the main axis of the link to permit relative lateral swinging of adjacent chain links. The outer ends $H^1$ of the pintle member H are received in the concave depressions $G^8$, $G^8$ on the inner faces of the side bars G, $G^1$. By reason of the curved and preferably spherical shape of the depressions $G^8$, the link whose arms are so engaged upon the pintle H may swing up and down in what may be called the normal bending movement of the chain, and by reason of the curved ends $H^1$ of the pintle H, the links may also have limited relative lateral bending or swinging. Since the slots or perforations $G^4$ are at right angles to the slots or perforations $G^6$, adjacent chain links must be swung to a position at right angles to each other to bring the two slots $G^6$ and the slot $G^4$ into alignment. In that position the pintle H may be inserted. When the links are swung from this position the pintle can be neither inserted nor removed and hence is properly held in the chain and permits the desired movement.

Where in the specification and claims the expression "pintle pin" has been used, this language is taken as meaning any pintle, whether it would normally be considered a pin or not, and specifically it includes the member H as shown in Figures 10, 11, and 12. That member is a flat bar with rounded edges and ends rather than a pin but it acts as a pintle. Hence it acts in the same manner as the pin-like pintles shown in the other figures. For purposes of convenience, therefore, the expression "pintle pin" has been used in many places, both in the specification and claims, and when so used it is to be taken as meaning any pintle, whether it be a pin or not, and any member which serves to join together adjacent chain links for relative movement with respect to each other is thus a pintle and comes within the meaning of the language used.

It will be realized that whereas we have herewith shown and described a practical operative device, nevertheless many changes might be made in the size, shape, number and disposition of parts without departing from the spirit of the invention and we wish, therefore, that the showing be taken as in a sense diagrammatic.

In particular any of the forms of the chain shown might have a top plate or might be made without the top plate and the exact shape and contour of the pintle pins of the several forms might be altered. The invention is not limited to the particular proportions shown and the contour and curvature of the ball and socket joints will depend largely upon the exact shape of the links and the amount of lateral bending desired.

The use and operation of the invention are as follows:

The assembly of the chain, whichever form is used, is approximately the same. It will be noticed that in each of the various forms, each chain link has one perforation so shaped that the pintle may slide through it endwise when the two are in one relative position because the outline of the perforation is substantially the same as the end outline of the pintle pin. In each form of the device the pintle pin carries a projection which makes its end outline out-of-round. This projection is so shaped that when the pintle is in the proper position with relation to the perforation in the inner portion of each link, the pin can be inserted into that perforation, but by reason of the shape of the perforation and the pintle it does not rotate in that perforation, being either locked against rotation or so limited in the relative turning movement permitted that it has no effective rotation and hence the link which engages the rounded outer ends of the pintle rotates about these outer ends while the pintle is in effect, or very largely, held against rotation. Thus when the chain bends along its longitudinal axis as, for example, about a sprocket, the pins are held against rotation with respect to the link which engages the projection on the pin.

When the chain is caused to bend laterally, the curved portion of the projection of the pintle pin rotates about the co-operating curved portion of the interior of the perforation of the link which engages it and so a limited lateral bending is permitted. The shape and extent of the co-operating curved portions on the pintle and on the interior of the link which engages it is calculated to permit the desired degree of lateral bending of the chain. For some uses this is very slight and for some it is substantial and the parts will be designed to permit the desired degree of movement. The movement just described occurs with all of the various forms of the invention illustrated, whether the concavity be on the pintle and the convexity on the interior of the perforation in the link or vice versa.

We claim:

1. A chain composed of links, each having a generally central portion and separated side arms, a perforation in each central portion, an arcuate bearing portion extending into said perforation and pins connecting said links, said pins having substantially cylindrical ends, and an intermediately placed enlargement with an arcuate portion of substantially the same curvature as and complementary to said arcuate bearing portion formed in the aforementioned perforation of said link.

2. A chain composed of links each having a generally central portion and separated side arms, a perforation in each central portion, an arcuate bearing portion extending into said perforation, and pins connecting said links, said pins having substantially cylindrical ends, an intermediately placed arcuate bearing of substantially the same curvature as and complementary to said arcuate bearing portion formed in the aforementioned perforation of said link.

3. A chain composed of links each having a generally central portion and separated side arms, a perforation in each central portion, a convex arcuate bearing portion extending into said perforation, and pins connecting said links, said pins having substantially cylindrical ends, an intermediately placed concave arcuate bearing of substantially the same curvature as and complementary to said arcuate bearing portion formed in the aforementioned perforation of said link.

4. A chain composed of links each having a generally central portion and separated side arms, a perforation in each central portion, a concave arcuate bearing portion extending into said perforation, and pins connecting said links, said pins having substantially cylindrical ends, an intermediately placed convex arcuate bearing of substantially the same curvature as and complementary to said arcuate bearing portion formed in the aforementioned perforation of said link.

WILLIAM W. SAYERS.
RICHARD F. BERGMANN.
GEORGE W. HAAFF.